United States Patent [19]

Kondo

[11] 4,398,554

[45] Aug. 16, 1983

[54] FLUX CONTROL DEVICE

[75] Inventor: Kenshi Kondo, Tokyo, Japan

[73] Assignee: Nihon Den-Netsu Keiki Co., Ltd., Tokyo, Japan

[21] Appl. No.: 252,437

[22] Filed: Apr. 9, 1981

[51] Int. Cl.³ .................................... G05D 11/08
[52] U.S. Cl. ............................... 137/91; 137/209; 137/212
[58] Field of Search ............... 137/91, 93, 209, 212; 222/399, 400.7

[56] References Cited

U.S. PATENT DOCUMENTS

| | | | |
|---|---|---|---|
| 2,604,108 | 7/1952 | Considine | 137/93 |
| 3,481,355 | 12/1969 | Watson | 137/93 |
| 3,490,483 | 1/1970 | Nicko | 137/212 |
| 3,820,562 | 6/1974 | Roberts | 137/209 |

*Primary Examiner*—Martin P. Schwadron
*Assistant Examiner*—R. G. Nilson
*Attorney, Agent, or Firm*—Stephen F. K. Yee

[57] ABSTRACT

A flux control device for maintaining the specific gravity and the surface level of a liquid flux contained in a fluxing vessel within predetermined ranges, includes a first reservoir for storing a concentrated flux, a second reservoir for storing a diluent, detectors for checking the liquid level and the specific gravity of the liquid flux in the fluxing vessel for any deviation from predetermined ranges, and first and second conduits extending between the vessel and the first reservoir and between the vessel and the second reservoir, respectively. Means are provided to apply a gas pressure selectively to the first and second reservoirs so that the concentrated flux and the diluent may be fed to the fluxing vessel through the first and second conduits, respectively, upon pressurization of the first and second reservoirs.

5 Claims, 5 Drawing Figures

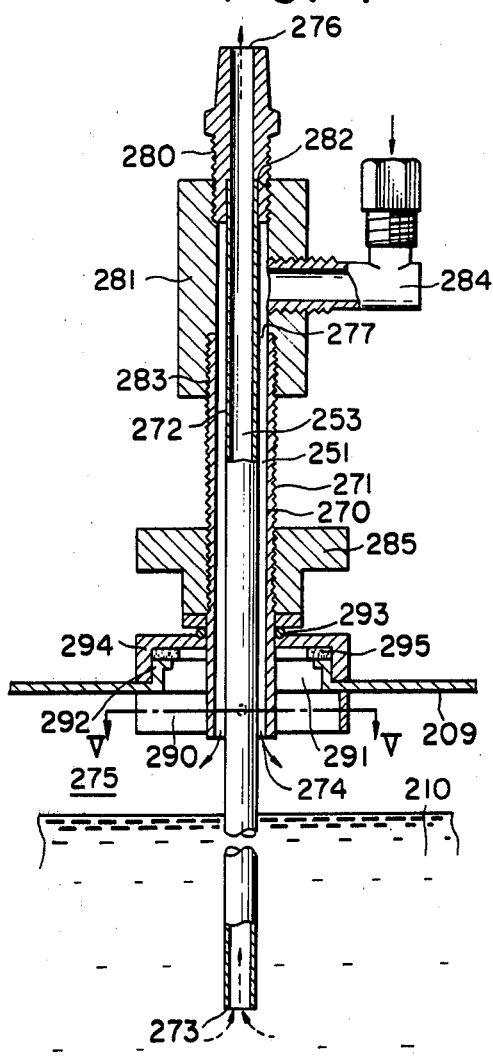
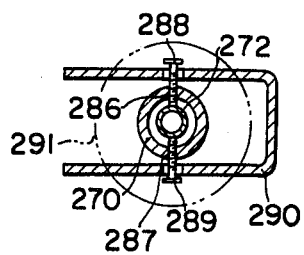

FLUX CONTROL DEVICE

BACKGROUND OF THE INVENTION

This invention relates generally to fluxers for applying a liquid flux to printed circuit boards, and more particularly to a flux control device which is capable of maintaining the specific gravity and level of a liquid flux contained within a vessel in predetermined ranges.

Numerous techniques, both automatic and manual, have thus far been practiced for successively feeding printed circuit boards to a soldering zone to receive a dip soldering treatment therein. In such a case, it is the general practice to convey the printed circuit boards to a fluxing zone for applying a liquid flux to the soldering portions prior to the dip soldering in order to obtain good soldering. As for the liquid flux, an undiluted or concentrated flux containing a resin as its major component is usually used after dilution into a predetermined concentration range with an alcohol or other suitable solvents. The liquid flux is contained in a vessel and applied to the lower side of a printed wiring board by an overflow, spray or other method. During the fluxing operation, it is desired to maintain the specific gravity and level of the liquid flux within the vessel in predetermined ranges since otherwise variations occur in its specific gravity and the level due to evaporation of the solvent and consumption of the flux.

FIG. 1 illustrates a conventional flux control device, in which designated by the reference numeral 1 is a vessel for containing a liquid flux 2 to be applied to printed circuit boards, not shown. The vessel 1 is provided with a specific gravity detector 3, a temperature detector 4 and a liquid level detector 5 for measuring the specific gravity, temperature and surface level, respectively, of the liquid flux 2.

The level detector 5 has three electrodes 5a, 5b and 5c with their tips positioned at different vertical levels, detecting whether or not the surface level of the liquid flux transcends predetermined upper and lower limits $L_u$ and $L_l$ by electric conduction or non-conduction across electrodes 5a and 5c or across electrodes 5b and 5c.

Indicated at 7a and 7b are solenoid valves, at 8 a pump, at 9 a reservoir for a concentrated flux 10, at 11 a reservoir for a diluent liquid 12, and at 13 a feed pipe means. A control unit 6 receives output signals from the specific gravity detector 3, temperature detector 4 and liquid level detector 5, monitoring whether or not the liquid flux is between predetermined upper and lower limits $\rho_u$ and $\rho_l$ of specific gravity and upper and lower limits $L_u$ and $L_l$ of liquid level, and, if not, producing instruction signals for actuating the solenoid valves 7a and 7b. More specifically, the input value of the specific gravity detector 3 is corrected to a value of a certain reference temperature on the basis of the input value from the temperature detector 4, and the corrected value is compared with the values of the preset upper and lower limits $\rho_u$ and $\rho_l$. When it is higher than the upper limit $\rho_u$, the control unit 6 produces an output for actuating the solenoid valve 7b and pump 8 to feed the diluent liquid 12 to the vessel 1. On the contrary, when it is lower than the lower limit $\rho_l$, the solenoid valve 7a and pump 8 are operated by the output of the control unit 6 to feed the concentrated flux 10 to the vessel 1.

Meanwhile, when the surface level of the liquid flux 2 in the vessel 1 reaches its predetermined lower limit, the level detector 5 produces an output of a lower limit value $L_l$ to feed the concentrated flux 10 or the diluent liquid 12 to the flux vessel 1 by alternately actuating the valves 7a and 7b along with the pump 8 until the liquid level reaches its predetermined upper limit while controlling the specific gravity within the predetermined range by the control unit 6.

However, the above-mentioned conventional device has a drawback in that due to the slow stop action of the pump 8 an instantaneous cut-off of the concentrated flux 10 or diluent liquid 12 is difficult even if the solenoid valves 7a and 7b are operated with a quick response. In addition, cleaning of the feed pipe of the undiluted flux is required every day at the end of operation since it is difficult to remove solidified flux from the pump 8.

SUMMARY OF THE INVENTION

The present invention provides an improved flux control device including a vessel for containing a liquid flux, first and second reservoirs for storing a concentrated flux and a diluent, respectively, checking means for checking the specific gravity and the surface level of the liquid flux in the vessel for any deviations from predetermined ranges, and feeding means for selectively feeding the concentrated flux and diluent in the first and second reservoirs to the vessel in such a manner as to maintain the specific gravity and the surface level of the liquid flux within the predetermined ranges. The improvement involves: the feeding means which comprises means for selectively applying an air pressure to the first and second reservoirs, and first and second conduits extending between the vessel and the first reservoir and between the vessel and the second reservoir, respectively, so that selected one of the concentrated flux and the diluent may be fed to the vessel through the first and second conduits, respectively, when the first and second reservoirs and selectively applied with the gas pressure.

It is, therefore, an object of the present invention to provide a flux control device which will eliminate the abovementioned difficulties or drawbacks.

It is a more specific object of the present invention to provide a flux control device employing feed means which is capable of selectively feeding under gas pressure the concentrated flux and diluent liquid to a liquid flux vessel to maintain the specific gravity and surface level of the liquid flux in predetermined ranges.

It is another object of the present invention to provide a flux control device which facilitates the cleaning and replacement of the feed pipe for the concentrated flux.

BRIEF DESCRIPTION OF THE DRAWINGS

The above and other objects, features and advantages of the invention will become apparent from the detailed description of the invention which follows, when considered in light of the accompanying drawings, in which:

FIG. 4 is an elevational view, partly in cross-section, schematically showing a gas-liquid feed assembly; and FIG. 5 is a cross-section taken on line V—V in FIG. 4.

DETAILED DESCRIPTION OF THE PREFERRED EMBODIMENTS OF THE INVENTION

Figure 1:
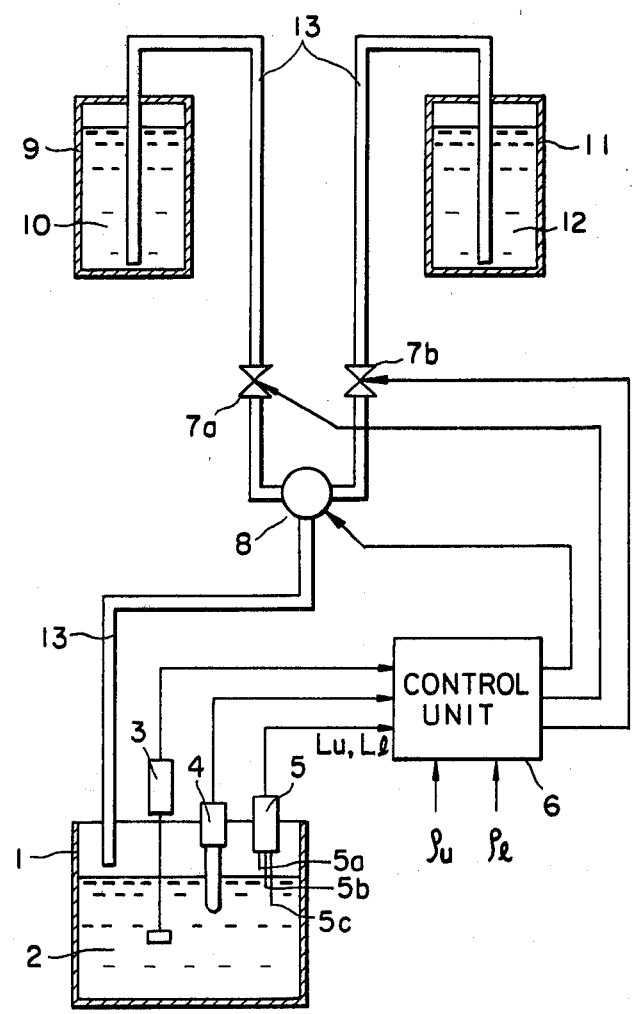
FIG. 1 is a schematic representation of a conventional flux control system.
Figure 2:
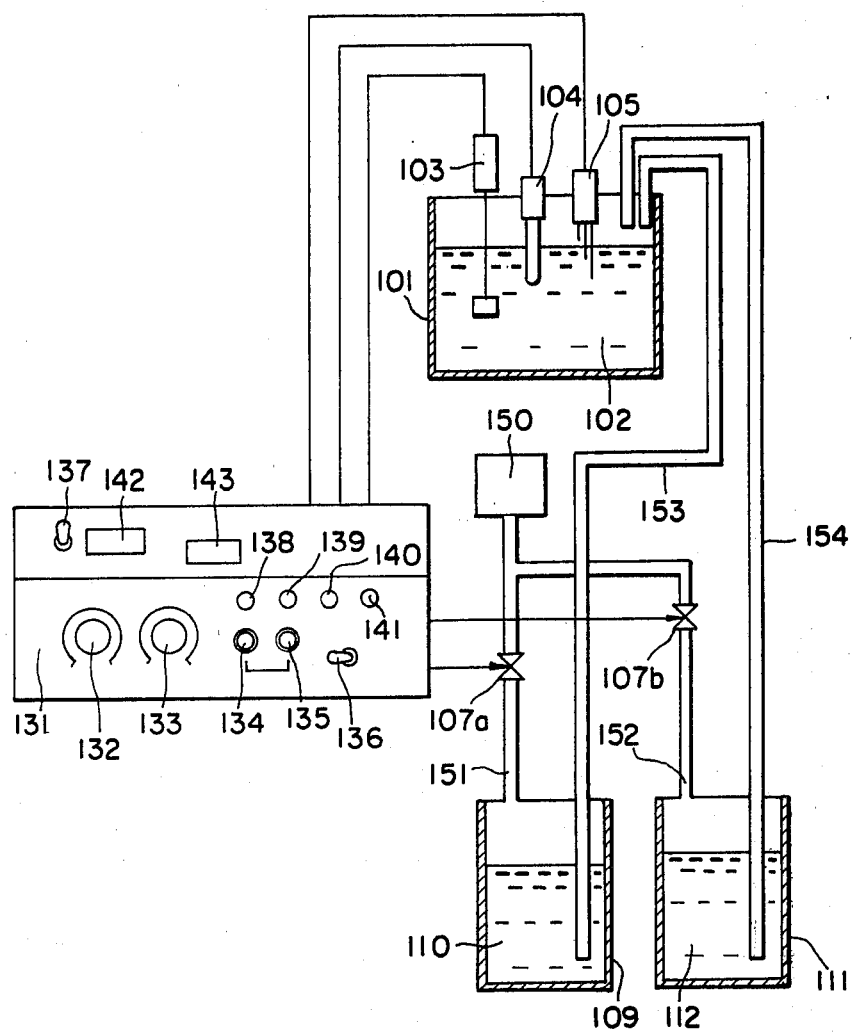
FIG. 2 is a schematic representation of a flux control system according to the present invention.

Referring to FIG. 2, there is shown a flux control device according to the present invention, including a vessel 101 for containing a liquid flux 102, a specific gravity detector 103, a temperature detector 104, a liquid level detector 105, a first solenoid valve 107a, a second solenoid valve 107b, a first reservoir 109 for storing a concentrated flux 110, and a second reservoir 111 for storing a diluent liquid 112 of a different specific gravity from the concentrated flux. The just-mentioned components correspond to those designated at 1-5, 7a, 7b, and 9-12 of FIG. 1, respectively. Indicated at 131 is a front panel of a control unit 106 which will be described hereinafter, having a dial 132 for setting the upper limit of the specific gravity, a dial 133 for setting the lower limit of the specific gravity, push-button switches 134 and 135 to be manipulated for feeding the concentrated flux 110 and diluent 112, respectively, in manual operation, a selector switch 136 for selection of either manual or automatic operation, a selector switch 137 for selection of display of either specific gravity or temperature, and pilot lamps 138 to 141 of which the pilot lamp 138 is lit during feed of the concentrated flux 110, 139 is lit during feed of the diluent 112, 140 is lit during automatic operation and 141 is lit during manual operation. Designated at 142 is a display for specific gravity or temperature and at 143 an alarm.

The flux control system further includes a source of a pressurized gas 150 which is in communication with the concentrated flux reservoir 109 and the diluent reservoir 111 through gas feed pipes 151 and 152 with the afore-mentioned solenoid valves 107a and 107b, respectively. Extended to the bottoms of the reservoir tanks 109 and 111 are one ends of pipes 153 and 154, the other ends of which are opened into the liquid flux vessel 101. As a result, when the valve 107a or 107b is in the open state, the space over the liquid level in the reservoir 109 or 111 is pressurized, urging the concentrated flux 110 or diluent 112 to flow into the vessel 101 through the pipe 153 or 154.

Figure 3:
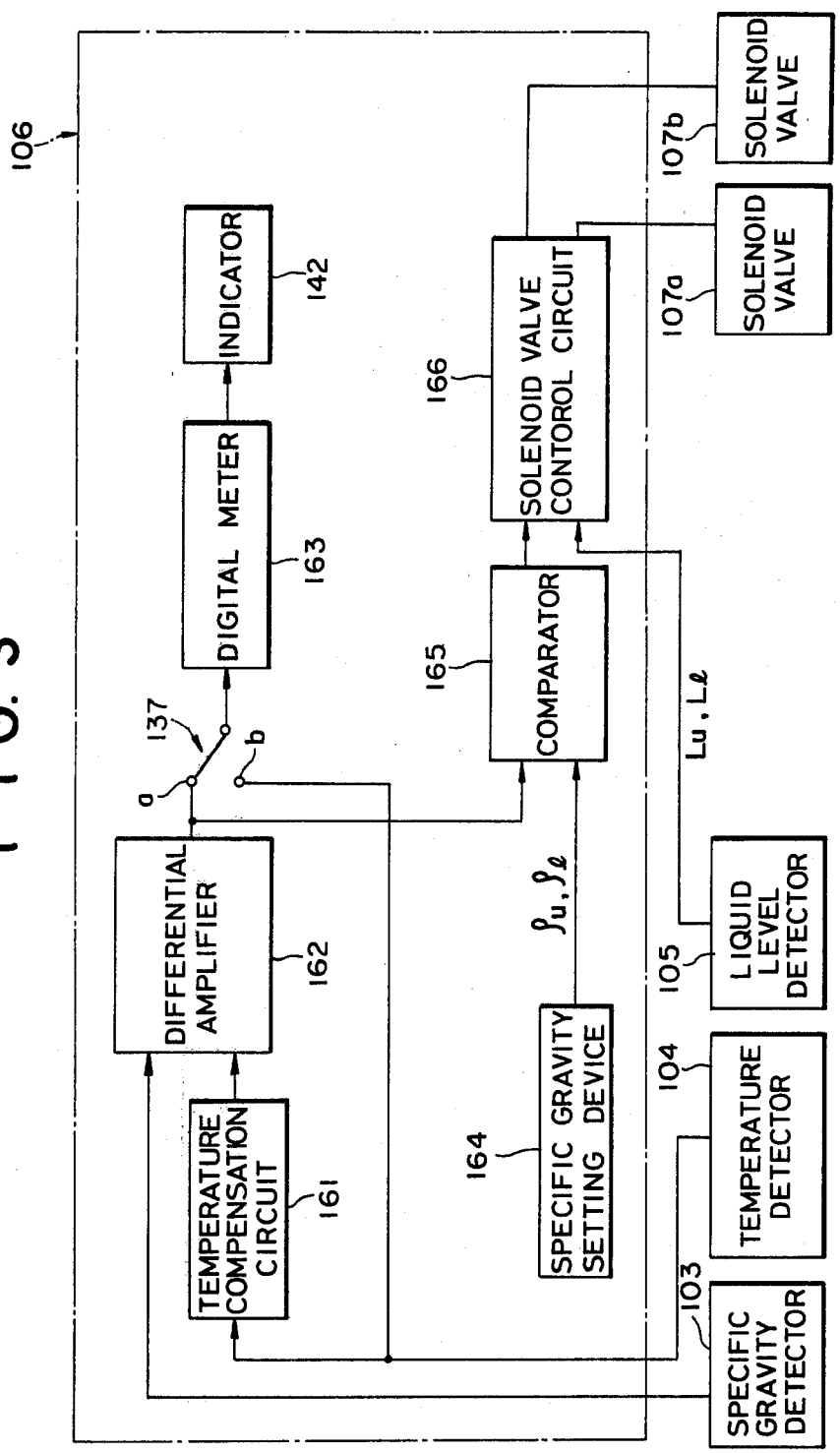
FIG. 3 is a block diagram of a control unit.

FIG. 3 is a block diagram illustrating major components of the control unit 106, including a temperature compensation circuit 161, a differential amplifier 162, a digital meter 163, a specific gravity setting device 164 operated by the dials 132 and 133, an upper and lower specific gravity limits comparator 165, and a solenoid valve control circuit 166.

The operation of the thus constructed flux control device will now be described first with regard to its automatic mode.

Referring again to FIG. 2, the selector switch 136 is turned to the automatic position, whereupon the pilot lamp 140 is lit to indicate that the system is in the automatic mode of operation. The temperature detector 104 produces an output signal indicative of the current temperature, which is fed to the temperature compensation circuit 161. If the detected temperature is higher than a given reference temperature level, for example, 20° C., the temperature correcting circuit 161 produces a negative differential output for compensation. If the detected signal is lower than 20° C., the temperature correcting circuit 161 produces a positive compensatory differential signal. The differential output is fed to the differential amplifier 162 which also receives an output from the specific gravity detector 103 for conversion to a value corresponding to the reference temperature. The output of the differential amplifier 162 is, if the selector switch 137 is closed on the side of contact a, fed to the digital meter 163 to display on the indicator 142 the converted value of specific gravity. When display of temperature is desired, the selector switch 137 is turned onto the contact b, whereupon the output of temperature detector 104 is fed to the digital meter 163 to display on the indicator 142 the current flux temperature.

The output of the differential amplifier 162 is simultaneously fed to the comparator 165 along with the preset values of upper and lower limits $\rho_u$ and $\rho_l$ thereby to compare the converted value of specific gravity with the preset values. In the event the converted value of specific gravity is outside the limit range, the comparator 165 produces an output thereby to actuate the solenoid valve 107a or 107b to feed the pressurized air from the compressed air source 150 to the concentrated flux reservoir 109 or the diluent liquid reservoir 111 through the conduit 151 or 152. Thus, concentrated flux 110 or the diluent liquid 112 is fed to the flux vessel 101 from the concentrated flux reservoir 109 or diluent reservoir 111 in proportion to the open time period of the valve 107a or 107b, until the specific gravity of the liquid flux 102 is in the predetermined range. However, should the liquid level detector 105 produces an output of $L_u$ indicative of the upper limit of the surface level of the liquid flux 102, the valve 107b or 107b is immediately closed.

If the liquid level detector 105 detects a drop of the surface level of the flux 102 below the lower limit and produces an output of $L_l$, the valves 107a and 107b are operated to alternately feed the concentrated flux 110 and the diluent liquid 112 to the flux vessel 101 until the output of upper limit $L_u$ appears while holding the specific gravity in the predetermined range. When the liquid level has not improved after a predetermined time length in spite of the operation of the valve 107a or 107b, the alarm 143 is actuated to warn of an abnormality, which may be exhaustion of the concentrated flux 110 or diluent liquid or clogging of the feed pipe 153 or 154. The circuit arrangement in this regard is known and thus omitted from illustration.

In manual operation, the pilot lamp 141 is lit upon turning the selector switch 136 to manual position to indicate that the control system is in manual mode of operation. Thereafter, the push button 134 or 135 is manipulated when necessary to feed the concentrated flux 110 or diluent liquid 112 to the flux vessel 101, for maintaining the displayed specific gravity on the indicator 142 between the upper and lower limits $\rho_u$ and $\rho_l$. If the liquid level drops below the lower limit, the alarm is actuated to produce a warning signal.

Although two on-off valves 107a and 107b are employed in the foregoing embodiment, they may of course be substituted by a single three-way valve if desired.

It will be appreciated from the foregoing description that, according to the present invention, the feeding of the concentrated flux or the diluent liquid which is under control of pressurized air can be cut off quickly, and the clogging which is caused to the feed line by the concentrated flux can be eliminated simply by replacing the feed pipe.

FIG. 4 illustrates a gas-liquid feed assembly integrally incorporating a gas feed pipe and a liquid feed pipe and mounted, by way of example, on a concentrated flux reservoir 209. Of course, a similar gas-liquid feed assembly may be provided for a diluent liquid reservoir. In FIG. 4, indicated at 270 is an outer pipe which is provided with an externally threaded portion 271 at the upper end thereof. An inner pipe 272 defining a liquid flow passage 253 therein is placed inside of the outer pipe 270 to define a gas flow passage, generally an annular passage 251, therebetween. The inner pipe 272 has a portion protruded out of the lower end 274 of the outer pipe 270 and terminating at the bottom of the reservoir 209 so that its end portion 273 serves as the inlet of the concentrated flux 210. On the other hand, the lower end 274 of the outer pipe 270 which serves as a gas inlet is opened into the reservoir 209, communicating the annular gas passage 251 with the upper space 275 above the concentrated flux in the reservoir 209. The upper end 276 of the inner pipe 272 is connected to a liquid inlet of the flux vessel which is not shown. The upper end 277 of the outer pipe 270 which serves as a gas intake port is connected to a pressurized gas source through a valve which is not shown. Therefore, when the just-mentioned valve is in the open state, a gas pressure is applied to the upper space 275 of the tank 209 through the annular gas passage 251 as indicated by arrows of solid line. As a result, the liquid in the reservoir 209 is fed to the liquid flux vessel through the liquid passage 253 as indicated by arrows of broken line.

The liquid feed assembly is hermetically mounted on the reservoir tank and arranged to permit easy removal of clogging material as well as easy replacement of the inner pipe 272 in the event the liquid flow passage 253 is blocked.

The inner pipe 272 is provided with external screw threads 280 at its upper end for threaded engagement with internal screw threads 282 at the upper end of a connector 281 which also has internal screw threads 283 at its lower end for threaded engagement with the externally threaded portion 271 of the outer pipe 270. The connector 281 has an elbow 284 threaded through a center portion of its side wall to communicate the pressurized gas source with the annular gas passage 251. A presser member 285 is threaded on the externally threaded portion 271 of the outer pipe 270.

As shown in FIG. 5, the outer pipe 270 is provided with a pair of screw holes 286 and 287 in radially opposing positions at its lower end for receiving screws 288 and 289 which have the respective tip ends adapted to be abutted against the outer periphery of the inner pipe 272 to hold the inner pipe 272 in a predetermined spaced relation with the outer pipe 270. The screws 288 and 289 serve also as a support for rotatably connecting a U-shaped stopper 290 to the outer pipe 270. The stopper 290 has a pair of legs which are of a length longer than a lip 292 of a mouth 291 of the reservoir 209, but is able to be inserted into the mouth 291 by turning the stopper 290 about the screws 288 and 289. Indicated at 293 is an O-ring, at 294 a cap fitted on the lip 292, and at 295 a packing.

For assembling the foregoing component parts, the outer pipe 270 with the pressing member 285, the inner pipe 272 and the elbow 284 are successively threaded into the connector 281 in the first place. Thereafter, the O-ring 293, cap 294 and packing 295 are placed on the outer pipe 270 and the stopper 290 is attached thereto by the screws 288 and 289, simultaneously fixing the inner pipe 272 in position. The stopper 290 is then tilted and inserted into the reservoir 209 through the mouth 292, tightening the presser member 285 after positioning the packing 295, cap 294 and O-ring 293 as shown in FIG. 4. As a result, the stopper 290 comes into engagement with the top underside wall surface of the reservoir, 209, hermetically sealing the outer peripheries of the outer pipe 270 and lip 292 of the tank 209 by the O-ring 293 and packing 295.

With the above-described gas-liquid feed assembly, it suffices to provide only one mouth or opening in the reservoir, in addition to the advantage that cleaning of the inner pipe is extremely easy.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. In a flux control device including a vessel for containing a liquid flux, a first reservoir for storing a concentrated flux, a second reservoir for storing a diluent, means for checking the specific gravity and surface level of the liquid flux in the vessel for any deviations from predetermined ranges, and means for selectively feeding the concentrated flux and diluent to the vessel from the first and second reservoirs in such a manner as to maintain the specific gravity and the surface level of the liquid flux in the vessel within the predetermined ranges, the improvement comprising said feeding means which includes:

a source of pressurized gas;
first and second gas-liquid feed assemblies coupled to the first and second reservoirs, respectively, each feed assembly having an outer pipe and an inner pipe defining a liquid passage therein and placed inside of the outer pipe to define a gas passage therebetween, said gas passage having one end thereof in open communication with the upper space within said respective reservoir and the other end in communication with said pressurized gas source, and said liquid passage having one end thereof in communication with the liquid in said respective reservoir and the other end in communication with said vessel;
means to removably mount each of the first and second gas-liquid feed assemblies on each of the first and second reservoirs, the mounting means including a first retaining element pivotally supported adjacent to an end portion of the outer pipe received within the reservoir, the retaining element pivotal about an axis substantially orthogonal to the longitudinal axis of the outer pipe, and a clamping member threadedly engaging the exterior surface of the outer pipe and adjustably movable along the outer pipe to clamp the first retaining member against the reservoir wall; and
means for selectively communicating said gas passages of said first and second gas-liquid feed assemblies with said pressurized gas source so that the concentrated flux and the diluent may be fed to said vessel through respective liquid passages when said first and second reservoirs are selectively communicated with said pressurized gas source through respective gas passages.

2. The flux control device as defined in claim 1, wherein said mounting means further includes a second retaining element disposed between the first retaining element and the clamping member and slidable along the outer pipe to close the reservoir opening receiving the gas-liquid feed assembly.

3. The flux control device as defined in claim 1, wherein the first retaining element is of a U-shape with the legs of the retaining element extending on opposite sides of the outer pipe.

4. The flux control device as defined in claim 3, including a threaded fastener extending through an opening in each leg of the U-shaped retaining element and being received within a threaded opening in the outer pipe, the first retaining element pivotally movable about the fasteners.

5. The flux control device as defined in claim 4, wherein the fasteners extend through the outer pipe and contact the inner pipe to adjustably position the inner pipe within the outer pipe.

* * * * *